United States Patent
Yun et al.

(10) Patent No.: US 11,078,424 B2
(45) Date of Patent: Aug. 3, 2021

(54) LIQUID CRYSTAL ALIGNING AGENT COMPOSITION, METHOD FOR PREPARING LIQUID CRYSTAL ALIGNMENT FILM USING SAME, AND LIQUID CRYSTAL ALIGNMENT FILM AND LIQUID CRYSTAL DISPLAY DEVICE USING SAME

(71) Applicant: LG CHEM, LTD., Seoul (KR)

(72) Inventors: Hyeongseuk Yun, Daejeon (KR); Jung Ho Jo, Daejeon (KR); Jun Young Yoon, Daejeon (KR); Hoonseo Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 22 days.

(21) Appl. No.: 16/497,330

(22) PCT Filed: Jan. 23, 2019

(86) PCT No.: PCT/KR2019/000971
§ 371 (c)(1),
(2) Date: Sep. 24, 2019

(87) PCT Pub. No.: WO2019/164138
PCT Pub. Date: Aug. 29, 2019

(65) Prior Publication Data
US 2021/0009902 A1    Jan. 14, 2021

(30) Foreign Application Priority Data

Feb. 21, 2018 (KR) .................. 10-2018-0020653

(51) Int. Cl.
*C09K 19/56* (2006.01)

(52) U.S. Cl.
CPC .......... *C09K 19/56* (2013.01); *C09K 2219/03* (2013.01); *C09K 2323/027* (2020.08); *C09K 2323/035* (2020.08)

(58) Field of Classification Search
CPC C09K 19/56; C09K 2219/03; C09K 2323/00; C09K 2323/02; C09K 2323/027; C09K 2323/035; C09K 2323/03; G02F 1/1337; G02F 1/133711; G02F 1/133723; G02F 1/13378; G02F 1/133784; G02F 1/133788
USPC ................. 428/1.1, 1.2, 1.26; 349/123, 127; 525/432
See application file for complete search history.

(56) References Cited

U.S. PATENT DOCUMENTS

| | | | | |
|---|---|---|---|---|
| 5,213,853 A | * | 5/1993 | Noonan ............ | C09K 19/0225 428/1.2 |
| 6,696,114 B1 | | 2/2004 | Kawatsuki et al. | |
| 2018/0230384 A1 | | 8/2018 | Jo et al. | |
| 2018/0298284 A1 | | 10/2018 | Jo et al. | |

FOREIGN PATENT DOCUMENTS

| | | | |
|---|---|---|---|
| CN | 103131429 | | 6/2013 |
| EP | 0697278 A1 | | 2/1996 |
| JP | H08-58024 | | 3/1996 |
| JP | H08-201828 | | 8/1996 |
| JP | H09-185064 | | 7/1997 |
| JP | 2000-267103 | | 9/2000 |
| JP | 2002-229039 | | 8/2002 |
| JP | 2002-328372 | | 11/2002 |
| JP | 2002328372 A | * | 11/2002 |
| JP | 2008-209872 | | 9/2008 |
| JP | 2013-113935 | | 6/2013 |
| JP | 2017-003727 A | | 1/2017 |
| JP | 2017003727 A | * | 1/2017 |
| KR | 10-2009-0010899 | | 1/2009 |
| KR | 10-2010-0025741 | | 3/2010 |
| KR | 10-2010-0098372 | | 9/2010 |
| KR | 10-2016-0142614 | | 12/2016 |
| KR | 10-2017-0055418 | | 5/2017 |
| TW | 201726810 | | 8/2017 |
| TW | 201739792 | | 11/2017 |
| WO | 2009-051186 | | 3/2011 |
| WO | 2015/152174 | | 10/2015 |

OTHER PUBLICATIONS

International Search Report and the Written Opinion of PCT/KR2019/000971, dated May 3, 2019.
Office Action of Korean Patent Office in Appl'n No. 10-2018-0020653, dated Jul. 24 2020.

* cited by examiner

*Primary Examiner* — Ruiyun Zhang
(74) *Attorney, Agent, or Firm* — Dentons US LLP

(57) ABSTRACT

Provided is a liquid crystal aligning agent composition including a liquid crystal polymer together with a polyimide-based (co)polymer, a method for preparing a liquid crystal alignment film using the same, and a liquid crystal alignment film and a liquid crystal display device using the same.

16 Claims, No Drawings

LIQUID CRYSTAL ALIGNING AGENT COMPOSITION, METHOD FOR PREPARING LIQUID CRYSTAL ALIGNMENT FILM USING SAME, AND LIQUID CRYSTAL ALIGNMENT FILM AND LIQUID CRYSTAL DISPLAY DEVICE USING SAME

CROSS-REFERENCE TO RELATED APPLICATIONS

This application is a National Stage Application of International Application No. PCT/KR2019/000971 filed on Jan. 23, 2019, which claims priority to and the benefits of the filing date of Korean Patent Application No. 10-2018-0020653 filed with the Korean Intellectual Property Office on Feb. 21, 2018, the entire contents of which are incorporated herein by reference.

FIELD

The present invention relates to a liquid crystal aligning agent composition capable of realizing excellent electrical characteristics at a level applicable to high performance liquid crystal display devices together with excellent liquid crystal alignment characteristics, a method for preparing a liquid crystal alignment film using the same, and a liquid crystal alignment film and a liquid crystal display device using the same.

BACKGROUND

In a liquid crystal display device, a liquid crystal alignment film plays a role of aligning liquid crystals in a predetermined direction. Specifically, a liquid crystal alignment film acts as a director for the arrangement of liquid crystal molecules, and thus, when the liquid crystals move due to an electric field to form an image, it allows the liquid crystals to align in an appropriate direction. In general, in order to obtain uniform brightness and a high contrast ratio in a liquid crystal display device, it is essential to uniformly align liquid crystals.

As one of the conventional methods of aligning liquid crystals, a rubbing method of coating a polymer film such as a polyimide onto a substrate such as glass or the like and rubbing a surface thereof using fibers such as nylon or polyester in a predetermined direction has been used. However, the rubbing method can cause serious problems during manufacturing process of the liquid crystal panel because fine dust or electrostatic discharge (ESD) occurs when the fiber and polymer film are rubbed.

In order to solve the problems of the rubbing method, a photo-alignment method for inducing anisotropy in a polymer film by light irradiation rather than the rubbing, and aligning liquid crystals using anisotropy, has been studied recently.

As materials that can be used for the photo-alignment method, various materials have been introduced, among which a polyimide is mainly used for various superior performance of a liquid crystal alignment film. However, the polyimide is usually poor in solubility in a solvent, so it is difficult to apply directly to a manufacturing process of coating it in a solution state to form an alignment film.

Accordingly, after coating in the form of a precursor such as a polyamic acid or a polyamic acid ester having excellent solubility, a heat treatment process is performed at a temperature of 200° C. to 230° C. to form the polyimide, which is then subjected to light irradiation to induce initial anisotropy through alignment treatment. Subsequently, an additional high-temperature heat treatment is performed to simultaneously achieve alignment stabilization by anisotropy as well as imidization conversion.

However, during the high-temperature firing process, as the polyamic acid remaining in the polyimide or the polyamic acid formed from the depolymerization reaction from polyimide causes side reactions, there has been a limit in that the liquid crystal display device can not satisfy a high level of electrical characteristics for realizing high-quality driving characteristics.

Thus, there is a need to develop a liquid crystal aligning agent composition capable of realizing excellent electrical characteristics at a level applicable to high performance liquid crystal display devices while achieving alignment characteristics as a liquid crystal alignment film.

SUMMARY

It is an object of the present invention to provide a liquid crystal aligning agent composition capable of realizing excellent electrical characteristics at a level applicable to high performance liquid crystal display devices together with excellent liquid crystal alignment characteristics.

It is another object of the present invention to provide a method for preparing a liquid crystal alignment film using the aforementioned liquid crystal aligning agent composition.

It is a further object of the present invention to provide a liquid crystal alignment film prepared by the aforementioned preparation method, and a liquid crystal display device including the same.

In order to achieve the above objects, the present invention provides a liquid crystal aligning agent composition including:

a polyimide-based (co)polymer containing at least one selected from the group consisting of a polyamic acid repeating unit, a polyamic acid ester repeating unit, and a polyimide repeating unit; and an aromatic polyester-based polymer.

The present invention also provides a method for preparing a liquid crystal alignment film including the steps of: coating the liquid crystal aligning agent composition onto a substrate to form a coating film; drying the coating film; irradiating the dried coating film with light or rubbing the coating film to perform alignment treatment; and heat-treating and curing the alignment-treated coating film.

In addition, the present invention provides a liquid crystal alignment film containing an aligned cured product of the liquid crystal aligning agent composition, and a liquid crystal display device including the same.

DETAILED DESCRIPTION

Hereinafter, a liquid crystal aligning agent composition, a method for preparing a liquid crystal alignment film using the same, and a liquid crystal alignment film using the same according to specific embodiments of the present invention will be described in more detail.

I. Liquid Crystal Aligning Agent Composition

According to one embodiment of the invention, a liquid crystal aligning agent composition can be provided, including: a polyimide-based (co)polymer containing at least one selected from the group consisting of a polyamic acid repeating unit, a polyamic acid ester repeating unit, and a polyimide repeating unit; and an aromatic polyester-based polymer.

The present inventors found through experiments that in the case of the liquid crystal aligning agent composition including an aromatic polyester-based polymer together with a polyimide-based (co)polymer as in the one embodiment described above, a liquid crystal cell provided with a liquid crystal alignment film obtained from the liquid crystal aligning agent composition not only has excellent liquid crystal alignment characteristics, but can also achieve improved electrical characteristics such a high voltage holding ratio, a high DC charging speed, and a low DC content remaining in the alignment film, thereby embodying certain aspects of the present invention.

According to the present invention, not only can anisotropy of the liquid crystal alignment film be induced by using a polyimide (co)polymer as in the related art, but also the anisotropy and the alignment property of the liquid crystal alignment film can be enhanced through the aromatic polyester-based polymer capable of maintaining the crystalline state even in a molten state and having liquid crystallinity, and also the liquid crystal properties (crystallinity in a molten state) of the aromatic polyester-based polymer are exhibited within a temperature range of 200° C. to 240° C. where the high-temperature firing of the polyimide-based (co)polymer is performed, and thereby the resistance of the liquid crystal alignment film to be finally produced can be lowered. This makes it possible to greatly improve the electrical characteristics of the liquid crystal alignment film, for example, the DC charging speed is increased in the liquid crystal cell using the liquid crystal alignment film, and the residual DC content is rapidly lowered.

In the liquid crystal aligning agent composition of one embodiment, when the polyimide-based (co)polymer and the aromatic polyester-based polymer are not simply mixed together, but are preferably mixed at a specific weight ratio of 1:99 to 1:0.5, it was confirmed that the alignment characteristics and electrical characteristics of the liquid crystal alignment film or the liquid crystal alignment cell obtained from the liquid crystal aligning agent composition can be improved to an optimum level.

In particular, when the aromatic polyester-based polymer is added in excess compared with the polyimide-based (co)polymer in the liquid crystal aligning agent composition of one embodiment, the effect of improving the electrical characteristics due to the aromatic polyester-based polymer can be maximized.

Hereinafter, the present invention will be described in more detail.

Unless specified otherwise herein, the following terms can be defined as follows.

As used herein, the (co)polymer means including both polymers or copolymers, and the polymer means a homopolymer composed of a single repeating unit. That is, in the present specification, the (co)polymer can include both homopolymer and copolymers.

Throughout the specification, when one part "includes" one constituent element, unless otherwise specifically described, this does not mean that another constituent element is excluded, but means that another constituent element can be further included.

In the present specification, examples of the substituents are described below, but are not limited thereto.

As used herein, the term "substituted" means that other functional groups instead of a hydrogen atom in the compound are bonded, and a position to be substituted is not limited as long as it is a position at which the hydrogen atom is substituted, that is, a position at which the substituent can be substituted, and when two or more are substituted, the two or more substituents can be the same as or different from each other.

As used herein, the term "substituted or unsubstituted" means being unsubstituted or substituted with one or more substituents selected from the group consisting of deuterium; a halogen group; a cyano group; a nitro group; a hydroxyl group; a carbonyl group; an ester group; an imide group; an amide group; a primary amino group; a carboxy group; a sulfonic acid group; a sulfonamide group; a phosphine oxide group; an alkoxy group; an aryloxy group; an alkylthioxy group; an arylthioxy group; an alkylsulfoxy group; an arylsulfoxy group; a silyl group; a boron group; an alkyl group; a cycloalkyl group; an alkenyl group; an aryl group; an aralkyl group; an aralkenyl group; an alkylaryl group; an alkoxysilylalkyl group; an arylphosphine group; and a heterocyclic group containing at least one of N, O, and S atoms, or being unsubstituted or substituted with a substituent to which two or more substituents are linked among the substituents exemplified above. For example, "the substituent to which two or more substituents are linked" can be a biphenyl group. That is, the biphenyl group can also be an aryl group, and can be interpreted as a substituent to which two phenyl groups are linked.

As used herein, the notation ┼ or ----- means a bond linked to another substituent group, and the direct bond means the case in which no separate atom is present at a part represented by L.

In the present specification, the alkyl group is a monovalent functional group derived from an alkane, and can be a straight-chain or a branched-chain. The number of carbon atoms of the straight chain alkyl group is not particularly limited, but is preferably 1 to 20. Also, the number of carbon atoms of the branched chain alkyl group is 3 to 20. Specific examples of the alkyl group include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethylpropyl, isohexyl, 2-methylpentyl, 4-methylhexyl, 5-methylhexyl, 2,6-dimethylheptane-4-yl, and the like, but are not limited thereto.

In the present specification, the haloalkyl group means a functional group in which the alkyl group as defined above is substituted by a halogen group, and examples of the halogen group include fluorine, chlorine, bromine, and iodine. The haloalkyl group can be substituted or unsubstituted.

In the present specification, a cycloalkyl group is a monovalent functional group derived from a cycloalkane, and can be monocylic or polycyclic, and is not particularly limited, but the number of carbon atoms thereof is preferably 3 to 20. According to another embodiment, the number of carbon atoms of the cycloalkyl group is 3 to 10. Specific examples thereof include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl, bicyclo[2,2,1]heptyl, and the like, but are not limited thereto. The cycloalkyl group can be substituted or unsubstituted.

In the present specification, an aryl group is a monovalent functional group derived from an arene, and is not particularly limited, but preferably has 6 to 20 carbon atoms, and can be a monocyclic aryl group or a polycyclic aryl group. The monocyclic aryl group can include, but is not limited to, a phenyl group, a biphenyl group, a terphenyl group, or the like. The polycyclic aryl group can include, but is not limited to, a naphthyl group, an anthracenyl group, a phenanthryl group, a pyrenyl group, a perylenyl group, a chrycenyl group, a fluorenyl group, or the like. The aryl group can be substituted or unsubstituted.

In the present specification, an alkylene group is a bivalent functional group derived from an alkane, and the description of the alkyl group as defined above can be applied except that the alkylene is a divalent functional group. For example, the alkylene group is a straight chain or a branched chain, and can include a methylene group, an ethylene group, a propylene group, an isobutylene group, a sec-butylene group, a tert-butylene group, a pentylene group, a hexylene group, or the like. The alkylene group can be substituted or unsubstituted.

In the present specification, an arylene group is a bivalent functional group derived from an arene, and the description of the aryl group as defined above can be applied, except that it is a divalent functional group. For example, it can be a phenylene group, a biphenylene group, a terphenylene group, a naphthalene group, a fluorenyl group, a pyrenyl group, a phenanthrenyl group, a perylene group, a tetracenyl group, an anthracenyl group, and the like. The arylene group can be substituted or unsubstituted.

In the present specification, a heteroaryl group includes one or more atoms other than carbon, that is, one or more heteroatoms, and specifically, the heteroatom can include one or more atoms selected from the group consisting of O, N, Se, S, and the like. The number of carbon atoms thereof is not particularly limited, but is preferably 4 to 20, and the heteroaryl group can be monocyclic or polycyclic. Examples of a heterocyclic group include a thiophene group, a furanyl group, a pyrrole group, an imidazolyl group, a thiazolyl group, an oxazolyl group, an oxadiazolyl group, a pyridyl group, a bipyridyl group, a pyrimidyl group, a triazinyl group, a triazolyl group, an acridyl group, a pyridazinyl group, a pyrazinyl group, a quinolinyl group, a quinazolinyl group, a quinoxalinyl group, a phthalazinyl group, a pyridopyrimidyl group, a pyridopyrazinyl group, a pyrazinopyrazinyl group, an isoquinolinyl group, an indolyl group, a carbazolyl group, a benzoxazolyl group, a benzimidazolyl group, a benzothiazolyl group, a benzocarbazolyl group, a benzothiophene group, a dibenzothiophene group, a benzofuranyl group, a phenanthrolinyl group (phenanthroline), a thiazolyl group, an isoxazolyl group, an oxadiazolyl group, a thiadiazolyl group, a benzothiazolyl group, a phenothiazinyl group, an aziridyl group, an azaindolyl group, an isoindolyl group, an indazolyl group, a purine group, a pteridyl group (pteridine), a beta-carboline group, a naphthyridyl group (naphthyridine), a ter-pyridyl group, a phenazinyl group, an imidazopyridyl group, a pyropyridyl group, an azepine group, a pyrazolyl group, a dibenzofuranyl group, and the like, but are not limited thereto. The heteroaryl group can be substituted or unsubstituted.

In the present specification, the cycloalkylene group is a bivalent functional group derived from a cycloalkane, and the description of the cycloalkyl group as defined above can be applied, except that it is a divalent functional group. The cycloalkylene group can be substituted or unsubstituted.

In the present specification, a heteroarylene group has 2 to 20 carbon atoms, 2 to 10 carbon atoms, or 6 to 20 carbon atoms. The description of the heteroaryl group as defined above can be applied to an aryl group containing O, N, or S, except that it is a divalent functional group. The heteroarylene group can be substituted or unsubstituted.

In the present specification, a multivalent organic group is a residue in which a plurality of hydrogen atoms bonded to an arbitrary compound are removed, and for example, it can be a divalent organic group, a trivalent organic group, or a tetravalent organic group. As an example, a tetravalent organic group derived from cyclobutane means a residue in which any four hydrogen atoms bonded to cyclobutane are removed.

In the present specification, a direct bond or a single bond means being connected to a bond line where no atoms or atomic groups exist at the corresponding position. Specifically, it means the case where no other atoms exist in the parts represented as $L_1$ and $L_2$ in the chemical formula.

(1) Polyimide-Based (Co)Polymer

The polyimide-based (co)polymer can include a polyimide-based homopolymer or a polyimide-based copolymer, and the polyimide-based homopolymer or polyimide-based copolymer can include a polyimide homopolymer or a polyimide copolymer containing only a polyimide repeating unit, or a derivative copolymer further containing a polyamic acid repeating unit or a polyamic acid ester repeating unit other than the polyimide repeating unit.

That is, the polyimide-based (co)polymer can include at least one selected from the group consisting of a polyamic acid repeating unit, a polyamic acid ester repeating unit, and a polyimide repeating unit. Specifically, the polyimide-based (co)polymer can include one polyamic acid repeating unit, one polyamic acid ester repeating unit, one polyimide repeating unit, or a copolymer in which two or more repeating units thereof are mixed.

The one or more repeating units selected from the group consisting of the polyamic acid repeating unit, the polyamic acid ester repeating unit, and the polyimide repeating unit can form the main chain of the polyimide-based (co)polymer.

The polyimide-based (co)polymer can react during photoalignment or rubbing alignment treatment to induce anisotropy of the liquid crystal alignment film finally produced, and through a high-temperature firing step after the alignment, imidization conversion can be made to achieve alignment stabilization.

More specifically, the polyimide repeating unit can include a repeating unit of the following Chemical Formula 2, the polyamic acid ester repeating unit can include a repeating unit of the following Chemical Formula 3, and the polyamic acid repeating unit can include a repeating unit of the following Chemical Formula 4:

[Chemical Formula 2]

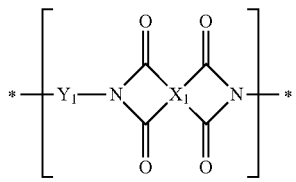

[Chemical Formula 3]

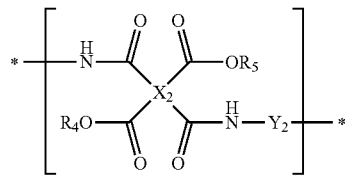

[Chemical Formula 4]

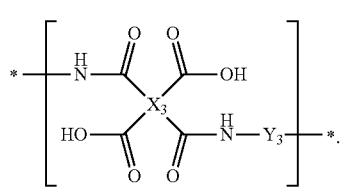

In Chemical Formulae 2 to 4, one of $R_4$ and $R_5$ is an alkyl group having 1 to 10 carbon atoms and the other is selected from the group consisting of hydrogen and an alkyl group having 1 to 10 carbon atoms; $X_1$ to $X_3$ are the same as or different from each other and are each independently a tetravalent organic group; and $Y_1$ to $Y_3$ are the same as or different from each other and are each independently a divalent organic group of the following Chemical Formula 5:

[Chemical Formula 5]

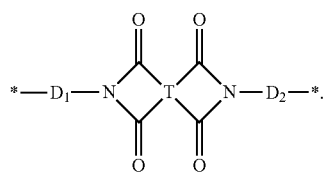

In Chemical Formula 5, T is a tetravalent organic group, and $D_1$ and $D_2$ are each independently an alkylene group having 1 to 20 carbon atoms, a heteroalkylene group having 1 to 10 carbon atoms, a cycloalkylene group having 3 to 20 carbon atoms, an arylene group having 6 to 20 carbon atoms, or a heteroarylene group having 2 to 20 carbon atoms.

The $Y_1$ to $Y_3$ can be a functional group derived from a diamine compound used in the synthesis of polyamic acid, polyamic acid ester, or polyimide. When $Y_1$ to $Y_3$ are each independently a divalent organic group of Chemical Formula 5, the polyimide-based (co)polymer is synthesized from a diamine containing an already imidized imide repeating unit, and thus, after formation of the coating film, light is immediately irradiated without a high-temperature heat treatment step to generate anisotropy. Subsequently, heat treatment can be performed to complete the alignment film. Therefore, it is possible to prepare a liquid crystal alignment film capable of not only greatly reducing the light irradiation energy and exhibiting an excellent alignment property and stability even by simple steps including one heat treatment step, but also having excellent voltage holding ratio and electrical characteristics.

Specifically, in Chemical Formula 5, $D_1$ and $D_2$ can each independently be a phenylene group.

In addition, T can be one of the tetravalent organic groups of the following Chemical Formula 6:

[Chemical Formula 6]

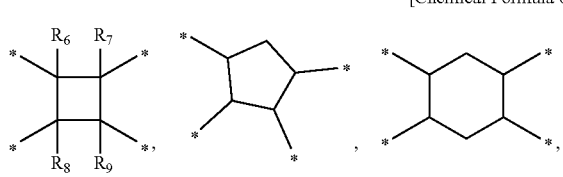

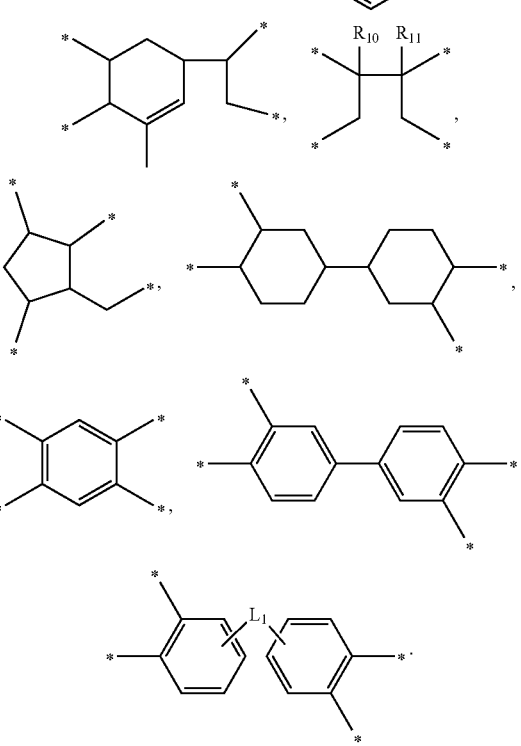

In Chemical Formula 6, $R_6$ to $R_{11}$ are each independently any one selected from the group consisting of hydrogen or an alkyl group having 1 to 6 carbon atoms, $L_1$ is a single bond, —O—, —CO—, —COO—, —S—, —SO—, —SO$_2$—, —CR$_{12}$R$_{13}$—, —(CH$_2$)$_t$—, —O(CH$_2$)$_t$O—, —COO(CH$_2$)$_t$OCO—, —CONH—, phenylene, or a combination thereof, wherein $R_{12}$ and $R_{13}$ are each independently hydrogen, an alkyl group having 1 to 10 carbon atoms, or a haloalkyl group having 1 to 10 carbon atoms, and t is an integer from 1 to 10.

More preferably, the T can be an organic group of the following Chemical Formula 6-1 or 6-2:

[Chemical Formula 6-1]

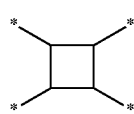

[Chemical Formula 6-2]

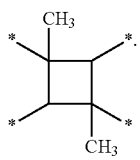

On the other hand, in Chemical Formulas 2 to 4, the $X_1$ to $X_3$ can be a functional group derived from a tetracarboxylic acid dianhydride compound used in the synthesis of polyamic acid, polyamic acid ester, or polyimide.

More specifically, the $X_1$ to $X_3$ can each independently be one of the tetravalent organic groups of the following Chemical Formula 6:

[Chemical Formula 6]

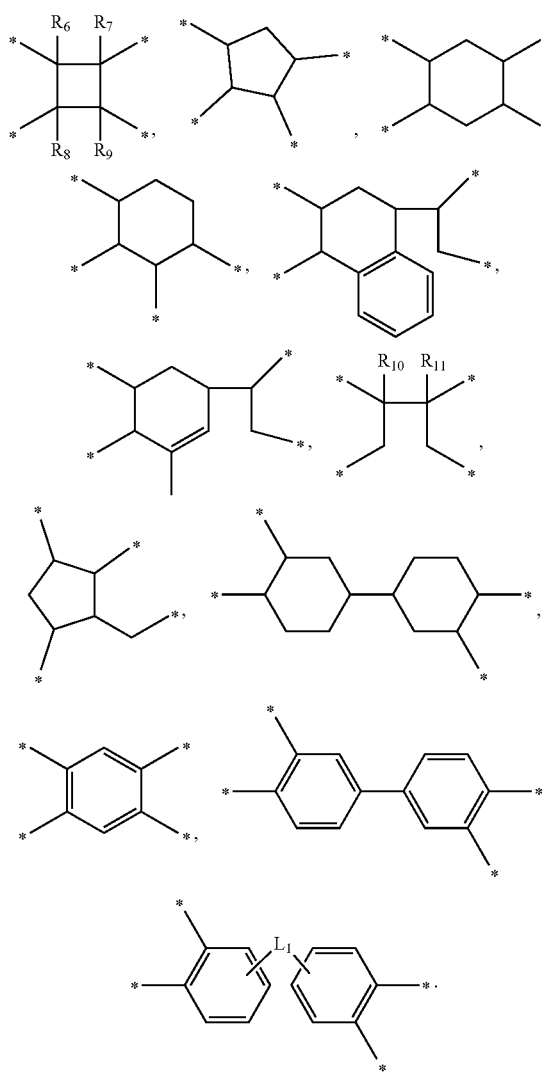

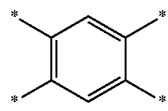

[Chemical Formula 6-3]

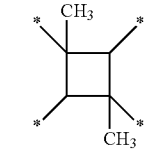

[Chemical Formula 6-4]

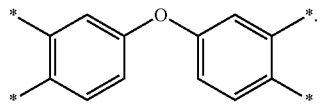

[Chemical Formula 6-5]

In Chemical Formula 6, $R_6$ to $R_{11}$ are each independently any one selected from the group consisting of hydrogen or an alkyl group having 1 to 6 carbon atoms, $L_1$ is a single bond, —O—, —CO—, —COO—, —S—, —SO—, —SO$_2$—, —CR$_{12}$R$_{13}$—, —(CH$_2$)$_t$—, —O(CH$_2$)$_t$O—, —COO(CH$_2$)$_t$OCO—, —CONH—, phenylene, or a combination thereof, wherein $R_{12}$ and $R_{13}$ are each independently hydrogen, an alkyl group having 1 to 10 carbon atoms, or a haloalkyl group having 1 to 10 carbon atoms, and t is an integer from 1 to 10.

More preferably, the $X_1$ to $X_3$ can each independently be any one of an organic group of the following Chemical Formula 6-3 derived from pyromellitic dianhydride; an organic group of the following Chemical Formula 6-4 derived from 1,3-dimethylcyclobutane-1,2,3,4-tetracarboxylic acid dianhydride; or an organic group of Chemical Formula 6-5 derived from 4,4'-oxydiphthalic dianhydride:

(2) Aromatic Polyester-Based Polymer

The liquid crystal aligning agent composition of one embodiment can contain an aromatic polyester-based polymer in addition to the above-mentioned polyimide-based (co)polymer. It is possible to remarkably enhance the electrical characteristics of the liquid crystal alignment film, while enhancing the anisotropy of the liquid crystal alignment film through the aromatic polyester-based polymer capable of maintaining the crystalline state even in a molten state and having liquid crystallinity.

The aromatic polyester-based polymer can include an aromatic polyester or a derivative polymer thereof, and the aromatic polyester means a case where all the functional groups in the repeating unit constituting polyester are aromatic.

The derivative polymer of the aromatic polyester means a case where the aromatic polyester further includes an aliphatic functional group or an alicyclic functional group along with an aromatic functional group in the repeating unit constituting the polyester.

The aromatic polyester-based polymer can include at least one of a residue derived from an aromatic diol, a residue derived from an aromatic dicarboxylic acid or a derivative thereof, and a residue derived from an aromatic dicarboxylic acid containing a hydroxy group or a derivative thereof, and consequently, the aromatic polyester-based polymer can form a liquid crystal in a solution or a molten state based on the rigidity of the main chain. That is, the aromatic polyester-based polymer is a liquid crystal polymer (LCP).

Specifically, the aromatic polyester-based polymer can include a repeating unit of the following Chemical Formula 1. The physical/chemical properties of the aromatic polyester-based polymer as a liquid crystal polymer appear to be due to the specific structure of the following Chemical Formula 1:

[Chemical Formula 1]

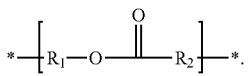

In Chemical Formula 1, $R_1$ and $R_2$ are the same as or different from each other, one of $R_1$ and $R_2$ is one of an arylene group having 6 to 20 carbon atoms and a heteroarylene group having 2 to 20 carbon atoms, and the other is an arylene group having 6 to 20 carbon atoms, a heteroarylene group having 2 to 20 carbon atoms, an alkylene group having 1 to 20 carbon atoms, or a cycloalkylene group having 3 to 20 carbon atoms.

That is, in Chemical Formula 1, $R_1$ can be one of an arylene group having 6 to 20 carbon atoms or a heteroarylene group having 2 to 20 carbon atoms; and $R_2$ can be one of an arylene group having 6 to 20 carbon atoms, a heteroarylene group having 2 to 20 carbon atoms, an alkylene group having 1 to 20 carbon atoms or a cycloalkylene group having 3 to 20 carbon atoms.

Further, in Chemical Formula 1, $R_2$ can be one of an arylene group having 6 to 20 carbon atoms and a heteroarylene group having 2 to 20 carbon atoms; and $R_1$ can be an arylene group having 6 to 20 carbon atoms, a heteroarylene group having 2 to 20 carbon atoms, an alkylene group having 1 to 20 carbon atoms, or a cycloalkylene group having 3 to 20 carbon atoms.

In Chemical Formula 1, $R_1$ is a functional group derived from a monomer containing a hydroxyl group forming an ester bond, and $R_2$ is a functional group derived from a monomer containing a carboxyl group or an acyl group forming an ester bond.

That is, Chemical Formula 1 is a repeating unit contained in the main chain of the polyester. In Chemical Formula 1, when $R_1$ and $R_2$ are different from each other, at least one of the two kinds of monomers (a monomer containing a hydroxy group or a monomer containing a carboxyl group or an acyl group) used for synthesizing a polyester main chain can necessarily contain an aromatic arylene group or a heteroarylene group.

Further, in Chemical Formula 1, when $R_1$ and $R_2$ are the same, one monomer containing a hydroxyl group, and a carboxyl group or an acyl group in the molecule, can contain an aromatic arylene group or a heteroarylene group.

More specifically, the repeating unit of Chemical Formula 1 can include a repeating unit of the following Chemical Formula 1-1:

[Chemical Formula 1-1]

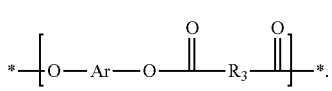

In Chemical Formula 1-1, Ar is an arylene group having 6 to 20 carbon atoms or a heteroarylene group having 6 to 20 carbon atoms, and $R_3$ is an alkylene group having 1 to 20 carbon atoms or a cycloalkylene group having 3 to 20 carbon atoms.

Preferably, in Chemical Formula 1-1, $R_3$ is an alkylene group having 8 to 14 carbon atoms, and Ar can be an arylene group having 10 to 15 carbon atoms (specifically, a biphenylene group).

In Chemical Formula 1-1, Ar is a functional group derived from a diol monomer containing a hydroxyl group forming an ester bond, and $R_3$ is a functional group derived from a dicarboxylic acid, a diacyl monomer containing a carboxyl group, or an acyl group forming an ester bond.

The aromatic polyester-based polymer can further contain other repeating units in addition to the repeating units of Chemical Formula 1, depending on the intended physical properties.

Examples of the other repeating units include a polyester repeating unit derived from an aliphatic alcohol component and an aliphatic dicarboxylic acid component, a polyester repeating unit derived from an aliphatic alcohol component and an alicyclic dicarboxylic acid component, a polyester repeating unit derived from an alicyclic alcohol component and an aliphatic dicarboxylic acid component, a polyester repeating unit derived from an alicyclic alcohol component and an alicyclic dicarboxylic acid component, a polyester repeating unit derived from an aliphatic dicarboxylic acid component containing a hydroxyl group, a polyester repeating unit derived from an alicyclic dicarboxylic acid component containing a hydroxy group, and the like.

That is, the aromatic polyester-based polymer can be prepared through an esterification reaction with at least one monomer selected among a diol component containing an aromatic diol, a dicarboxylic acid component containing an aromatic dicarboxylic acid or an aromatic diacyl compound, an aromatic dicarboxylic acid containing a hydroxy group, and an aromatic diacyl compound containing a hydroxyl group.

During the esterification reaction, an esterification reaction can be carried out by a monomer mixture in which, in addition to the above-mentioned monomers, a diol component containing an aliphatic diol or an alicyclic diol, a dicarboxylic acid component containing an aliphatic dicarboxylic acid, an aliphatic diacyl compound or an alicyclic dicarboxylic acid, a alicyclic diacyl compound, or an aliphatic dicarboxylic acid containing a hydroxy group, an aliphatic diacyl compound containing a hydroxy group, an alicyclic dicarboxylic acid containing a hydroxy group, and an alicyclic diacyl compound containing a hydroxyl group are additionally mixed, if necessary.

Specific conditions of the esterification reaction are not particularly limited, and various synthesis methods known in the art can be applied without limitation.

The weight average molecular weight of the aromatic polyester-based polymer can be 10,000 g/mol to 100,000 g/mol. In the present specification, the weight average molecular weight means a weight average molecular weight in terms of polystyrene measured by the GPC method. In the process of determining the weight average molecular weight in terms of polystyrene measured by the GPC method, a commonly known analyzing device, a detector such as a refractive index detector, and an analytical column can be used. Commonly applied conditions for temperature, solvent, and flow rate can be used. Specific examples of the measurement conditions include a temperature of 30° C., a chloroform solvent, and a flow rate of 1 mL/min.

The aromatic polyester-based polymer can have liquid crystallinity at 200° C. to 240° C. The liquid crystallinity means a property that the aromatic polyester-based polymer has crystallinity in a molten state. The temperature range of 200° C. to 240° C. at which the aromatic polyester-based polymer can have liquid crystallinity is a temperature range in which high-temperature firing of the polyimide-based (co)polymer added together is performed. Together with the high-temperature firing of the polyimide-based (co)polymer, the liquid crystal properties of the aromatic polyester-based polymer are exhibited, and the resistance of the liquid crystal alignment film finally produced can be lowered. Consequently, the electrical characteristics of the liquid crystal alignment film can be remarkably improved, for example, the DC charging speed is increased in the liquid crystal cell using the liquid crystal alignment film, and the residual DC content is rapidly lowered.

On the other hand, when the temperature range in which the aromatic polyester-based polymer has liquid crystallinity is less than 200° C. or more than 240° C., the alignment property of the aromatic polyester-based polymer is not induced, and thus it is difficult to sufficiently realize the liquid crystal alignment property of the liquid crystal alignment film finally produced.

The polyimide-based (co)polymer and the aromatic polyester-based polymer can be mixed in a weight ratio of 1:99 to 1:0.5, 1:20 to 1:0.5, or 1:9 to 1:0.45. As described above, since the polyimide-based (co)polymer contains a certain amount of already imidized imide repeating units, there is a feature that after formation of the coating film, it can irradiate light immediately without a high-temperature heat treatment step to generate anisotropy, and subsequently conducts heat treatment to complete the alignment film. The aromatic polyester-based polymer has a feature of improving electrical characteristics such as a voltage holding ratio.

When the polyimide-based (co)polymer and the aromatic polyester-based polymer having these characteristics are mixed and used in the above weight ratio range, the excellent light reactivity and liquid crystal alignment characteristics of the polyimide-based (co)polymer can mutually complement the excellent electrical characteristics of the aromatic polyester-based polymer, and it is possible to produce a liquid crystal alignment film having both superior alignment characteristics and electrical characteristics.

If the mixing weight ratio between the polyimide-based (co)polymer and the aromatic polyester-based polymer is excessively decreased to less than 1:0.5, the weight ratio of the aromatic polyester-based polymer to the polyimide-based (co)polymer is greatly reduced and it can be difficult to sufficiently improve the electrical characteristics of the liquid crystal alignment film.

II. Method of Preparing Liquid Crystal Alignment Film

In addition, the present invention provides a method for preparing a liquid crystal alignment film including: a step of coating the liquid crystal aligning agent composition onto a substrate to form a coating film (step 1); a step of drying the coating film (step 2); a step of irradiating the dried coating film with light or rubbing the coating film to perform alignment treatment (step 3); and a step of heat-treating and curing the alignment-treated coating film (step 4).

Step 1 is a step of coating the liquid crystal aligning agent composition onto a substrate to form a coating film. The details of the liquid crystal aligning agent composition include those described above in one embodiment.

The method of coating the liquid crystal aligning agent composition onto a substrate is not particularly limited, and for example, a method such as screen printing, offset printing, flexographic printing, inkjet printing, and the like can be used.

Further, the liquid crystal aligning agent composition can be dissolved or dispersed in an organic solvent. Specific examples of the organic solvent include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethyl sulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate, and the like. They can be used alone or in combination of two or more.

In addition, the liquid crystal aligning agent composition can further include other components in addition to the organic solvent. In a non-limiting example, when the liquid crystal aligning agent composition is coated, additives capable of improving the uniformity of the thickness of a film and the surface smoothness, improving the adhesion between a liquid crystal alignment film and a substrate, changing the dielectric constant and conductivity of a liquid crystal alignment film, or increasing the density of a liquid crystal alignment film, can be further included. Examples of these additives include various kinds of solvents, surfactants, silane-based compounds, dielectrics, crosslinking compounds, etc.

Step 2 is a step of drying the coating film formed by coating the liquid crystal aligning agent composition onto a substrate.

The step of drying the coating film can be performed by a heating means such as a hot plate, a hot air circulating oven, an infrared oven, and the like, and the drying can be performed at a temperature of 50° C. to 150° C., or 50° C. to 100° C.

Step 3 is a step of irradiating the dried coating film with light or rubbing the coating film to perform alignment treatment. More preferably, Step 3 is a step of irradiating the coating film immediately after the drying step with light or rubbing the coating film to perform alignment treatment.

In the present specification, the phrase "coating film immediately after the drying step" refers to irradiating the light immediately after the drying step without carrying out a heat treatment at a temperature higher than that of the drying step, and steps other than the heat treatment can be added.

More specifically, when a liquid crystal alignment film is produced using a conventional liquid crystal alignment agent including polyamic acid or polyamic acid ester, it includes a step of irradiating light after essentially performing a high-temperature heat treatment for imidization of polyamic acid. However, when a liquid crystal alignment film is produced using the liquid crystal alignment agent composition of the one embodiment described above, it does not include the heat treatment step, and light is directly irradiated to perform alignment treatment, and then the alignment-treated coating film is cured by a heat treatment, thereby enabling production of an alignment film.

In the alignment treatment step, the light irradiation can be performed by irradiating polarized ultraviolet rays having a wavelength of 150 nm to 450 nm. In this case, the intensity of the light exposure can vary depending on the kind of the polymer for a liquid crystal aligning agent, and energy of 10 mJ/cm$^2$ to 10 J/cm$^2$, preferably energy of 30 mJ/cm$^2$ to 2 J/cm$^2$, can be irradiated.

As for the ultraviolet rays, polarized ultraviolet rays selected among the ultraviolet rays subjected to polarization treatment by a method of passing through or reflecting by a polarizing device using a substrate in which a dielectric anisotropic material is coated onto the surface of a transparent substrate such as quartz glass, soda lime glass, soda lime-free glass, etc., a polarizer plate on which aluminum or metal wires are finely deposited, or a Brewster's polarizing device by the reflection of quartz glass, etc., are irradiated to perform the alignment treatment. Herein, the polarized ultraviolet rays can be irradiated perpendicularly to the surface of the substrate, or can be irradiated by directing an angle of incidence toward a specific angle. By this method, the alignment capability of the liquid crystal molecules is imparted to the coating film.

Further, in the alignment treatment step, a method using a rubbing cloth can be employed. More specifically, in the rubbing treatment, the surface of the coating film after the heat treatment step can be rubbed in one direction while rotating the rubbing roller in which a rubbing cloth is attached to a metal roller.

Step 4 is a step of heat-treating and curing the alignment-treated coating film. In this case, the heat treatment can be performed by a heating means such as a hot plate, a hot-air circulation furnace, an infrared furnace, and the like, and the heat treatment can be performed at a temperature of 180° C. to 300° C., 200° C. to 300° C., or 200° C. to 240° C.

III. Liquid Crystal Alignment Film

Further, the present invention can provide a liquid crystal alignment film prepared in accordance with the method for preparing a liquid crystal alignment film described above.

Specifically, the liquid crystal alignment film can include an aligned cured product of the liquid crystal aligning agent composition of the one embodiment. The aligned cured product means a material obtained through an alignment step and a curing step of the liquid crystal aligning agent composition of the one embodiment.

As described above, when a liquid crystal aligning agent composition including: a polyimide-based (co)polymer containing at least one selected from the group consisting of a polyamic acid repeating unit, a polyamic acid ester repeating unit, and a polyimide repeating unit; and an aromatic polyester-based polymer is used, it is possible to prepare a liquid crystal alignment film having improved electric characteristics such as a high voltage holding ratio in the liquid crystal cell, high DC charging speed, and thus low DC content remaining in the alignment film.

The thickness of the liquid crystal alignment film is not particularly limited, but for example, it can be freely adjusted within the range of 0.01 μm to 1000 μm. If the thickness of the liquid crystal alignment film increases or decreases by a specific value, the physical properties measured in the alignment film can also change by a certain value.

IV. Liquid Crystal Display Device

In addition, the present invention provides a liquid crystal display device including the liquid crystal alignment film described above.

The liquid crystal alignment film can be introduced into a liquid crystal cell by a known method, and likewise, the liquid crystal cell can be introduced into a liquid crystal display device by a known method. The liquid crystal alignment film can be prepared from the liquid crystal aligning agent composition of the present invention, thereby achieving excellent stability together with excellent various physical properties. Consequently, the liquid crystal display device capable of exhibiting high reliability can be provided.

According to the present invention, a liquid crystal aligning agent composition capable of realizing excellent electrical characteristics at a level applicable to a high performance liquid crystal display device, a method for preparing a liquid crystal alignment film using the same, and a liquid crystal alignment film and a liquid crystal display device using the same, can be provided.

EXAMPLES

The present invention will be described in more detail by way of examples. However, these examples are given for illustrative purposes only, and the scope of the invention is not intended to be limited to or by these examples.

Preparation Example

Preparation of Diamine

Preparation Example 1

Synthesis of Diamine DA-1

Diamine DA-1 was synthesized according to the following Reaction Scheme 1:

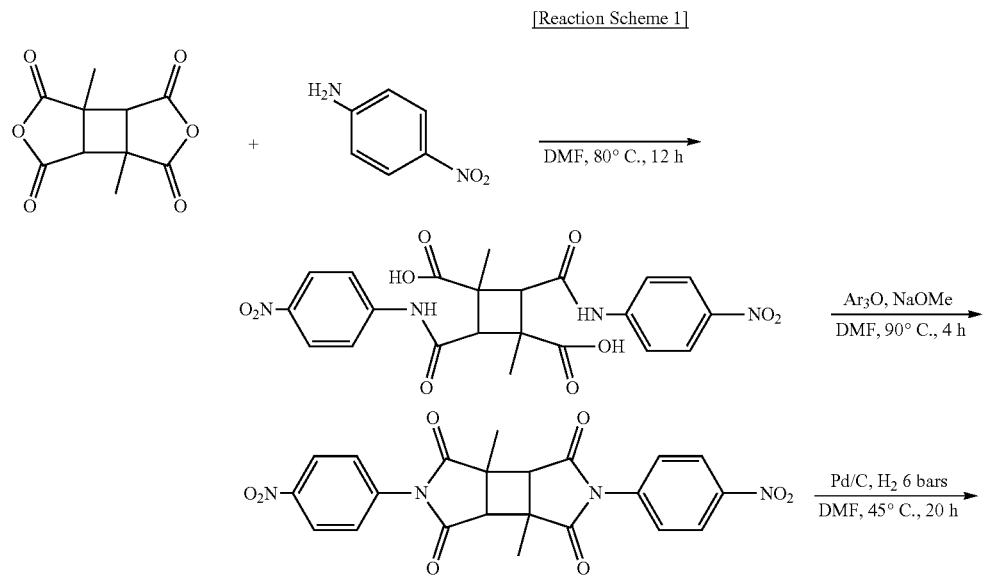

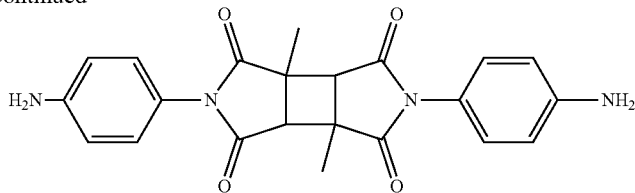

1,3-dimethylcyclobutane-1,2,3,4-tetracarboxylic dianhydride (DMCBDA) and 4-nitroaniline were dissolved in DMF (dimethylformamide) to prepare a mixture. Subsequently, the mixture was reacted at about 80° C. for about 12 hours to prepare an amic acid. The amic acid was then dissolved in DMF, and acetic anhydride and sodium acetate were added thereto to prepare a mixture. The amic acid contained in the mixture was then imidized at about 90° C. for about 4 hours. The imide thus obtained was dissolved in DMAc (dimethylacetamide), and then Pd/C was added thereto to prepare a mixture. The resulting mixture was reduced at 45° C. under hydrogen pressure of 6 bar for 20 minutes to prepare diamine DA-1.

Preparation Example 2

Synthesis of Diamine DA-2

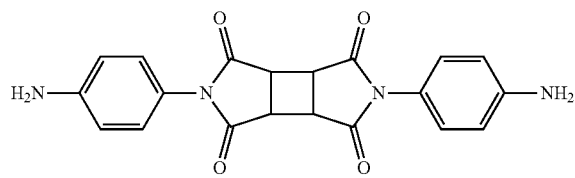 [SMILES: Nc1ccc(N2C(=O)C3C(C2=O)C2C(=O)N(c4ccc(N)cc4)C(=O)C32)cc1]

DA-2 having the above structure was prepared in the same manner as in Preparation Example 1, except that cyclobutane-1,2,3,4-tetracarboxylic dianhydride (CBDA) was used instead of 1,3-dimethylcyclobutane-1,2,3,4-tetracarboxylic dianhydride.

Synthesis Example

Polymer for Liquid Crystal Aligning Agent Composition

Synthesis Example 1

Preparation of First Polymer for Liquid Crystal Aligning Agent P-1

5.0 g (13.3 mmol) of DA-2 prepared in Preparation Example 2 was completely dissolved in 71.27 g of anhydrous N-methyl pyrrolidone (NMP). Then, 2.92 g (13.03 mmol) of 1,3-dimethyl-cyclobuthane-1,2,3,4-tetracarboxylic dianhydride (DMCBDA) was added to the solution under an ice bath and stirred at room temperature for 16 hours. The obtained solution was poured into an excess amount of distilled water to form a precipitate. Then, the formed precipitate was filtered and washed twice with distilled water and again three times with methanol. The thus-obtained solid product was dried in a vacuum oven at 40° C. for 24 hours to obtain 6.9 g of a polymer for a liquid crystal aligning agent P-1.

As a result of confirming the molecular weight of P-1 through GPC, the number average molecular weight (Mn) was 15,500 g/mol, and the weight average molecular weight (Mw) was 31,000 g/mol. Further, the monomer structure of the polymer P-1 was determined by the equivalent ratio of the monomers used, the ratio of the imine structure in the molecule was 50.5%, and the ratio of the amic acid structure was 49.5%.

Synthesis Example 2

Preparation of Second Liquid Crystal Polymer for Liquid Crystal Aligning Agent Q-1

In the reaction vessel, 4,4'-biphenol and diacyl chloride of the following Chemical Formula A were added and mixed, and then allowed to react while heating to prepare a liquid crystal polymer (weight average molecular weight: 10,000 to 100,000 g/mol) having a repeating unit structure of the following Chemical Formula B:

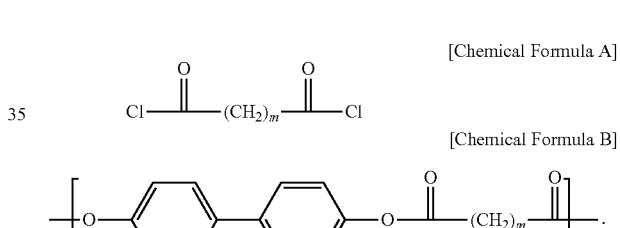

In Chemical Formulae A and B, m is an integer from 8 to 14.

Examples and Comparative Examples

Preparation of Liquid Crystal Aligning Agent Composition and Liquid Crystal Cell (1) Preparation of Liquid Crystal Aligning Agent Composition Example 1

0.2 g of the polymer P-1 obtained in Synthesis Example 1 and 1.8 g of the polymer Q-1 obtained in Synthesis Example 2 were dissolved in a mixed solvent of 30 g of NMP and 8 g of n-butoxyethanol to obtain a 5 wt % solution. Then, the obtained solution was subjected to pressure filtration with a filter made of poly(tetrafluoroethylene) having a pore size of 0.2 μm to produce a liquid crystal aligning agent composition A-1.

Example 2

0.4 g of the polymer P-1 obtained in Synthesis Example 1 and 1.6 g of the polymer Q-1 obtained in Synthesis Example 2 were dissolved in a mixed solvent of 30 g of NMP and 8 g of n-butoxyethanol to obtain a 5 wt % solution. Then, the obtained solution was subjected to pressure filtration with a filter made of poly(tetrafluoroethylene) having a pore size of 0.2 μm to produce a liquid crystal aligning agent composition A-2.

Example 3

0.6 g of the polymer P-1 obtained in Synthesis Example 1 and 1.4 g of the polymer Q-1 obtained in Synthesis Example 2 were dissolved in a mixed solvent of 30 g of NMP and 8 g of n-butoxyethanol to obtain a 5 wt % solution. Then, the obtained solution was subjected to pressure filtration with a filter made of poly(tetrafluoroethylene) having a pore size of 0.2 ∞m to produce a liquid crystal aligning agent composition A-3.

Comparative Example 1

2.0 g of the polymer P-1 obtained in Synthesis Example 1 was dissolved in a mixed solvent of 30 g of NMP and 8 g of n-butoxyethanol to obtain a 5 wt % solution. Then, the obtained solution was subjected to pressure filtration with a filter made of poly(tetrafluoroethylene) having a pore size of 0.2 μm to produce a liquid crystal aligning agent composition B-1.

Comparative Example 2

2.0 g of the polymer Q-1 obtained in Synthesis Example 2 was dissolved in a mixed solvent of 30 g of NMP and 8 g of n-butoxyethanol to obtain a 5 wt % solution. Then, the obtained solution was subjected to pressure filtration with a filter made of poly(tetrafluoroethylene) having a pore size of 0.2 μm to produce a liquid crystal aligning agent composition B-2.

Reference Example 1

1.4 g of the polymer P-1 obtained in Synthesis Example 1 and 0.6 g of the polymer Q-1 obtained in Synthesis Example 2 were dissolved in a mixed solvent of 30 g of NMP and 8 g of n-butoxyethanol to obtain a 5 wt % solution. Then, the obtained solution was subjected to pressure filtration with a filter made of poly(tetrafluoroethylene) having a pore size of 0.2 μm to produce a liquid crystal aligning agent composition C-1.

(2) Preparation of Liquid Crystal Cell

A liquid crystal cell was produced by the following methods by using the liquid crystal aligning agents prepared in Examples 1 to 3, Comparative Examples 1 and 2, and Reference Example 1.

The liquid crystal aligning agent was coated onto a substrate (lower plate) in which comb-shaped IPS (in-plane switching) mode ITO electrode patterns having a thickness of 60 nm, an electrode width of 3 μm, and spacing between electrodes of 6 μm were formed on a rectangular glass substrate having a size of 2.5 cm×2.7 cm and onto a glass substrate (upper plate) having no electrode pattern, each using a spin coating method.

Then, the substrates onto which the liquid crystal aligning agent was coated were placed on a hot plate at about 70° C. for 3 minutes to evaporate the solvent. In order to subject the thus-obtained coating film to alignment treatment, ultraviolet rays of 254 nm were irradiated with an intensity of 1 J/cm$^2$ using an exposure apparatus in which a linear polarizer was adhered to the coating film of each upper and lower plates.

Subsequently, the coating film was fired (cured) in an oven at about 230° C. for 30 minutes to obtain a coating film having a thickness of 0.1 μm. Then, a sealing agent impregnated with ball spacers having a size of 3 μm was applied to the edge of the upper plate excluding the liquid crystal injection hole. Then, the alignment films formed on the upper plate and the lower plate were aligned such that they faced each other and the alignment directions were aligned with each other, and then the upper and lower plates were bonded together and the sealing agent was cured to prepare an empty space. Then, a liquid crystal was injected into the empty cells to prepare an IPS mode liquid crystal cell.

Experimental Example

Measurement of Physical Properties of Liquid Crystal Aligning Agent Composition and Liquid Crystal Alignment Cell The physical properties of the liquid crystal aligning agent composition or liquid crystal alignment film obtained in the examples and comparative examples, and the liquid crystal alignment cell prepared using the same, were measured by the following methods, and the results are shown in Table 1.

1. Evaluation of Liquid Crystal Alignment Characteristics

Polarizing plates were attached to the upper and lower substrates of the liquid crystal cell produced as above so that they were perpendicular to each other. At this time, the polarization axis of the polarizing plate attached to the lower plate was made parallel to the alignment axis of the liquid crystal cell. The liquid crystal cell to which the polarizing plate was attached was then attached to a backlight with brightness of 7000 cd/m$^2$, and the brightness in the black state was measured using a PR-880 instrument, a device for measuring luminance or brightness, and the liquid crystal alignment characteristics were evaluated based on the following criteria.

Good: 0.2 cd/cm$^2$ or less

Poor: more than 0.2 cd/cm$^2$

2. Voltage Holding Ratio (VHR)

The voltage holding ratio of the liquid crystal alignment cell was measured under the conditions of 1 Hz and 60° C. using 6254C equipment available from TOYO Corporation, and were evaluated based on the following criteria.

Good: 85% or more

Poor: less than 85%

3. Evaluation of RDC (Residual DC Voltage, Residual DC)

For the liquid crystal alignment cell, DC stress was set to +DC in the range of 0.5 to 1 V, and applied at 60° C. for 1 minute, and then left in a state where no voltage was applied for 2 minutes. The remaining amount of DC was measured as residual DC, and was evaluated based on the following criteria.

Good: 100 mV or less

Poor: more than 100 mV

TABLE 1

Results of measurement of experimental examples of examples and comparative examples

| Category | First polymer [P-1]:Second polymer [Q-1] weight ratio | Liquid crystal alignment characteristic | VHR characteristic | RDC characteristic |
| --- | --- | --- | --- | --- |
| Example 1 | 10:90 | Good | Good | Good |
| Example 2 | 20:80 | Good | Good | Good |
| Example 3 | 30:70 | Good | Good | Good |
| Comparative Example 1 | 100:0 | Good | Poor | Poor |
| Comparative Example 2 | 0:100 | Poor | Good | Good |
| Reference Example 1 | 70:30 | Good | Poor | Poor |

As shown in Table 1, the liquid crystal alignment films of Examples 1 to 3 using the liquid crystal aligning agent compositions including both the first polymer for a liquid crystal aligning agent and the second polymer for a liquid crystal aligning agent of the present invention showed satisfactory results in all of the liquid crystal alignment characteristics, the voltage holding ratio, and the residual DC, whereas the liquid crystal alignment films of Comparative Examples 1 and 2, in which only one kind of the first polymer for liquid crystal aligning agent and the second polymer for liquid crystal aligning agent were used showed poor results in some or all of the above evaluation items.

The invention claimed is:

1. A liquid crystal aligning agent composition, comprising:
a polyimide-based (co)polymer containing at least one repeating unit selected from the group consisting of a polyamic acid repeating unit, a polyamic acid ester repeating unit, and a polyimide repeating unit; and
an aromatic polyester-based polymer that includes a repeating unit of the following Chemical Formula 1-1:

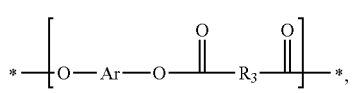

Chemical Formula 1-1 wherein in Chemical Formula 1-1:
Ar is an arylene group having 10 to 15 carbon atoms; and
$R_3$ is an alkylene group having 8 to 14 carbon atoms.

2. The liquid crystal aligning agent composition of claim 1, wherein the polyimide-based (co)polymer and the aromatic polyester-based polymer are mixed in a weight ratio of 1:99 to 1:0.5.

3. The liquid crystal aligning agent composition of claim 1, wherein the aromatic polyester-based polymer has a weight average molecular weight of 10,000 g/mol to 100,000 g/mol.

4. The liquid crystal aligning agent composition of claim 1, wherein the aromatic polyester-based polymer has liquid crystallinity at 200° C. to 240° C.

5. The liquid crystal aligning agent composition of claim 1, wherein the polyimide repeating unit has the following Chemical Formula 2, the polyamic acid ester repeating unit has the following Chemical Formula 3, and the polyamic acid repeating unit has the following Chemical Formula 4:

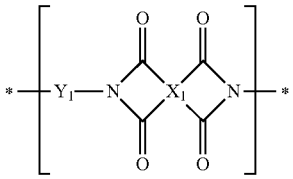

[Chemical Formula 2]

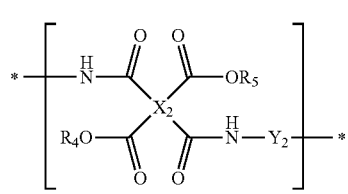

[Chemical Formula 3]

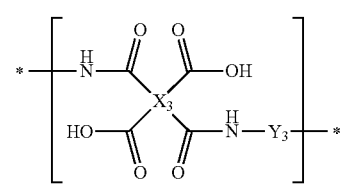

[Chemical Formula 4]

wherein in Chemical Formulae 2 to 4:
one of $R_4$ and $R_5$ is an alkyl group having 1 to 10 carbon atoms and the other is selected from the group consisting of hydrogen and an alkyl group having 1 to 10 carbon atoms;
$X_1$ to $X_3$ are the same as or different from each other, and are each independently a tetravalent organic group; and
$Y_1$ to $Y_3$ are the same as or different from each other and are each independently a divalent organic group of the following Chemical Formula 5:

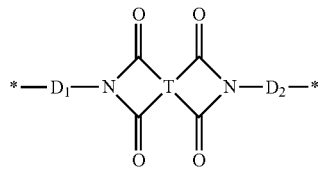

Chemical Formula 5 wherein in Chemical Formula 5:
T is a tetravalent organic group; and
$D_1$ and $D_2$ are each independently an alkylene group having 1 to 20 carbon atoms, a heteroalkylene group having 1 to 10 carbon atoms, a cycloalkylene group having 3 to 20 carbon atoms, an arylene group having 6 to 20 carbon atoms, or a heteroarylene group having 2 to 20 carbon atoms.

6. The liquid crystal aligning agent composition of claim 5, wherein $X_1$ to $X_3$ and T are each independently a tetravalent organic group having one of the following formulae:

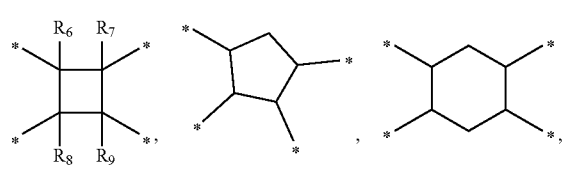

-continued

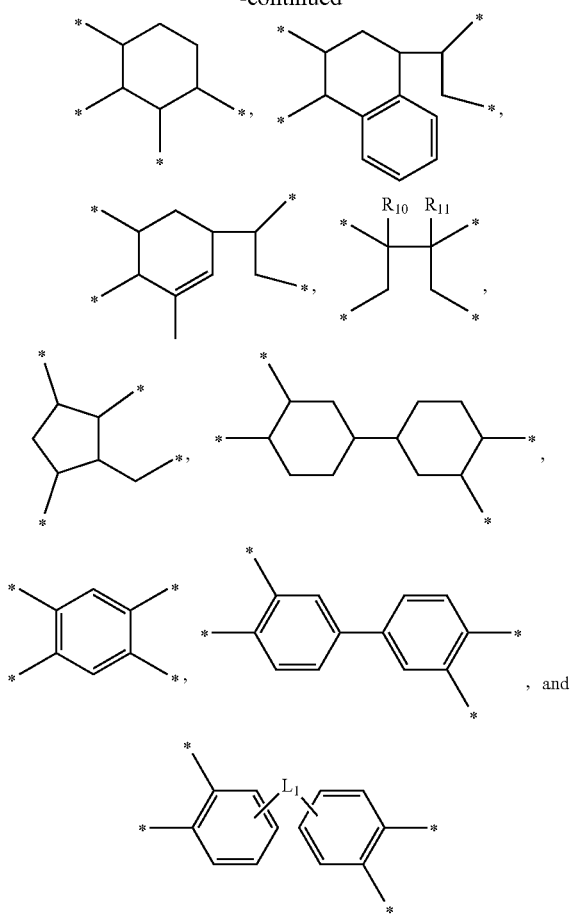

wherein:

$R_6$ to $R_{11}$ are each independently any substituent selected from the group consisting of hydrogen and an alkyl group having 1 to 6 carbon atoms;

$L_1$ is a single bond, —O—, —CO—, —COO—, —S—, —SO—, —SO$_2$—, —CR$_{12}$R$_{13}$—, —(CH$_2$)$_t$—, —O(CH$_2$)$_t$O—, —COO(CH$_2$)$_t$OCO—, —CONH—, phenylene, or a combination thereof;

$R_{12}$ and $R_{13}$ are each independently hydrogen, or an alkyl group having 1 to 10 carbon atoms or a haloalkyl group having 1 to 10 carbon atoms; and t is an integer from 1 to 10.

7. A method for preparing a liquid crystal alignment film, comprising:
coating the liquid crystal aligning agent composition of claim 1 onto a substrate to form a coating film;
drying the coating film;
irradiating the dried coating film with light or rubbing the coating film to provide an alignment-treated coating film; and
heat-treating and curing the alignment-treated coating film.

8. The method of claim 7, wherein the step of drying the coating film is performed at a temperature of 50° C. to 150° C.

9. The method of claim 7, wherein the step of heat-treating and curing the alignment-treated coating film is performed at a temperature of 180° C. to 300° C.

10. A liquid crystal alignment film, comprising an aligned cured product of the liquid crystal aligning agent composition of claim 1.

11. A liquid crystal display device, comprising the liquid crystal alignment film of claim 10.

12. The method of claim 7, wherein the step of heat-treating and curing the alignment-treated coating film is performed at a temperature of 200° C. to 300° C.

13. The method of claim 7, wherein the step of heat-treating and curing the alignment-treated coating film is performed at a temperature of 200° C. to 240° C.

14. The liquid crystal aligning agent composition of claim 1, wherein the polyimide-based (co)polymer and the aromatic polyester-based polymer are mixed in a weight ratio of 1:20 to 1:0.5.

15. The liquid crystal aligning agent composition of claim 1, wherein the polyimide-based (co)polymer and the aromatic polyester-based polymer are mixed in a weight ratio of 1:9 to 1:0.45.

16. A liquid crystal alignment film, prepared by the method of claim 7.

* * * * *